May 21, 1957   R. C. FANCIL   2,793,074
FERTILIZER CONTAINER AND DISPENSER
Filed Feb. 7, 1956   2 Sheets-Sheet 1

Robert C. Fancil
INVENTOR.

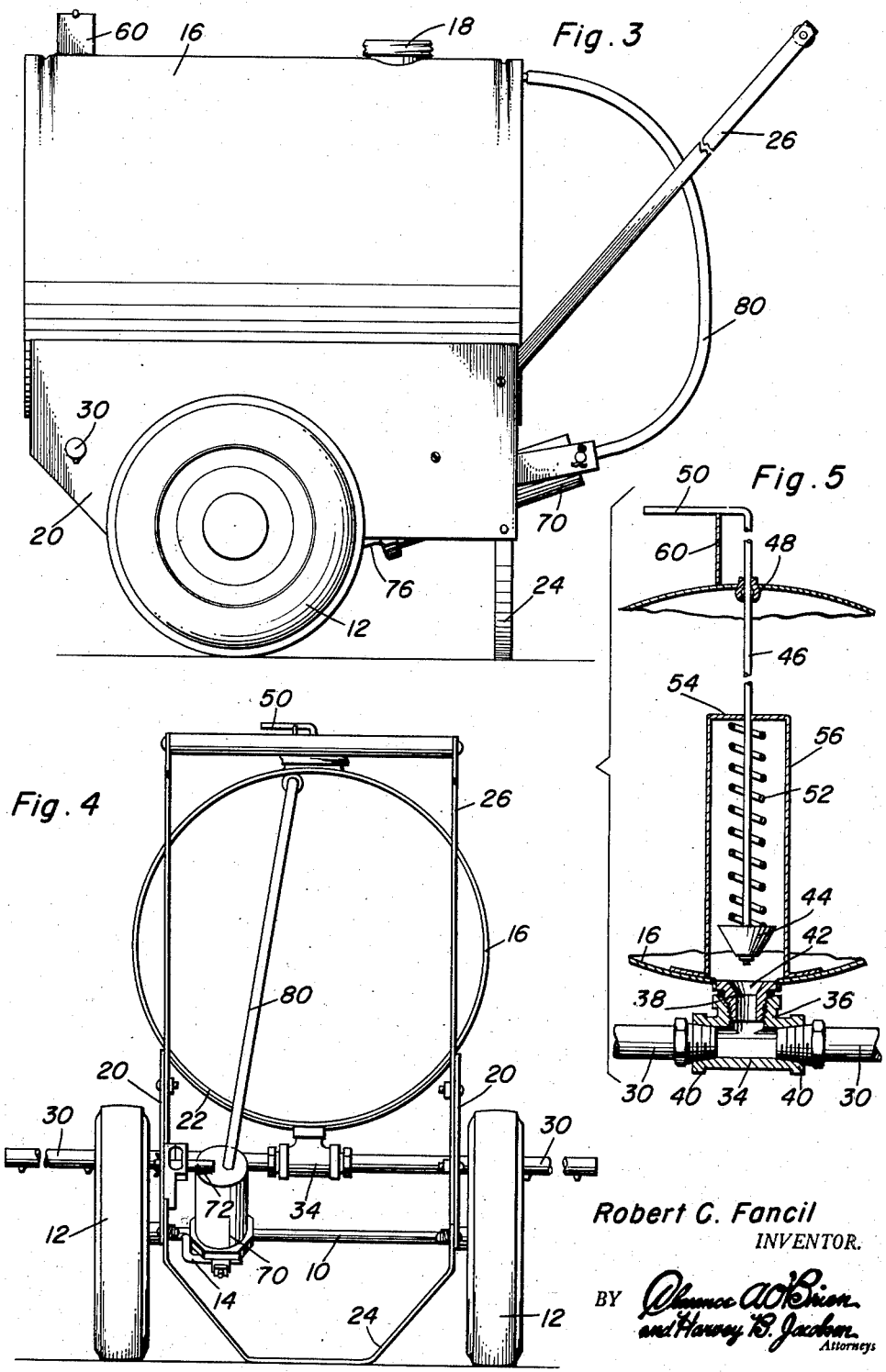

United States Patent Office 2,793,074
Patented May 21, 1957

2,793,074
FERTILIZER CONTAINER AND DISPENSER

Robert C. Fancil, Warsaw, Ind., assignor to Lawn-Gro, Inc., Winona Lake, Ind., a corporation of Indiana Application February 7, 1956, Serial No. 563,992

5 Claims. (Cl. 299—43)

This invention comprises novel and useful improvements in a fertilizer container and dispenser and more specifically relates to an apparatus specifically adapted for dispensing fertilizer or other liquids to a lawn and the like.

The primary object of this invention is to provide a dispensing apparatus for liquid fertilizer which shall be of a readily portable and easily manipulated character for dispensing fertilizer and other liquids upon lawns and the like.

A further object of the invention is to provide a fertilizer dispenser in conformance with the foregoing object which shall include a pumping device for applying a fluid pressure to the liquid fertilizer to assist in dispensing and spraying the same; and wherein the pump shall be capable of operation in an improved manner upon movement of the device.

A further object of the invention is to provide a dispensing apparatus as set forth in the foregoing objects wherein the control of the liquid fertilizer from the storage tank to the spray head of the device shall be easily and satisfactorily effected.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a side elevational view of the apparatus of Figures 1 and 2;

Figure 4 is an end elevational view taken from the left end of the apparatus as viewed in Figures 1–3; and Figure 5 is a fragmentary detail view taken upon an enlarged scale substantially upon the vertical transverse plane indicated by the section line 5—5 of Figure 2 and showing the control valve in its open position.

Figure 2:
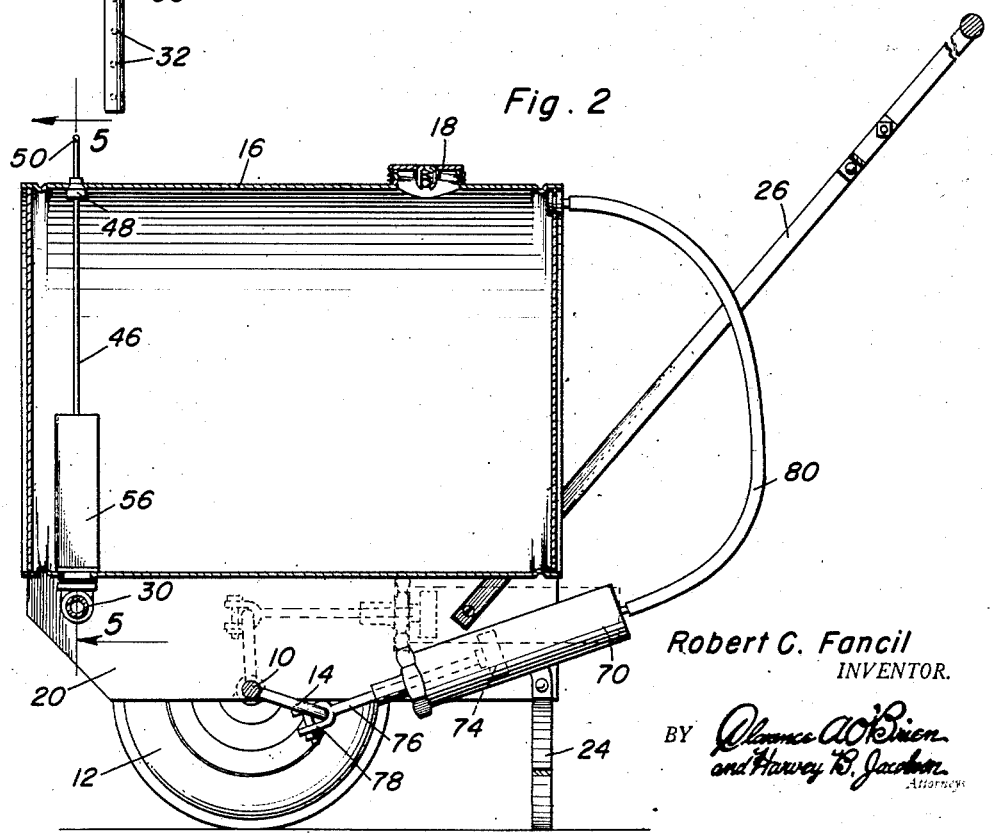
Figure 2 is a vertical central longitudinal sectional view taken substantially upon the plane indicated by section line 2—2 of Figure 1, the operation of the pump being indicated in dotted lines therein.

In carrying out the principles of this invention there is conveniently provided a mobile apparatus of a cart-like character and which consists of an axle 10 having a pair of supporting wheels 12 fixedly secured thereto. As will be most readily apparent from Figures 2 and 4, this axle is provided with a fixed crank throw or crank arm 14 for a purpose to be subsequently set forth.

Mounted upon and supported by the axle is a container or tank 16 which may be of any suitable character, shape, size and material, and as illustrated consists of a horizontally disposed cylindrical receptacle provided at its upper end with a filler closure cap 18. As will be best apparent from Figures 3 and 4, the tank 16 is supported on a cradle including a pair of vertical supporting plates 20 having an arcuate tank supporting strap therebetween, and which plates are journaled upon the axle 10, and are provided, at what may be termed the rear end of the tank, with a supporting leg assembly 24. Also, secured to the rear portions of these plates is a handle assembly 26 by means of which the progress of the device may be readily directed and controlled.

A spray header is provided consisting of a pair of oppositely extending pipes 30, extending transversely of the tank and parallel to the axle, the outer ends of the pipes extending through suitable apertures in the plates 20, the pipes being provided with a plurality of spray nozzles 32.

As will be best apparent from Figures 4 and 5, it will be seen that there is provided means for delivering liquid fertilizer from the tank to the spray head. This delivery means consists of a T-coupling 34 having a stem portion 36 which is screw threadedly engaged into an externally threaded nipple 38 depending from the bottom part of the tank 16. As will be understood, the nipple 38 may be considered as a part of the T-fitting if desired. The T-coupling further includes a pair of oppositely directed internally threaded arm portions 40 into which the adjacent ends of the pipes 30 are secured to provide the spray head of the apparatus.

Control means are provided for regulating the flow of liquid fertilizer from the tank 16 to the spray head. This control means consists of a generally conical valve seat 42 formed in the upper end of the element 38 and with which cooperates the conical valve body 44 of a reciprocating valve. The valve body has a vertical valve stem 46 secured thereto which extends through a suitable packing gland 48 in the top of the tank 16, being provided at its upper end with a laterally extending control handle 50.

A compression spring 52 encircling the valve stem and disposed with its ends abutting the valve body 44 and the upper horizontal portion 54 of a U-shaped spring retaining and valve stem guiding bracket 56 serves to yieldingly urge the valve towards its closed position upon the valve seat.

Rising from the upper surface of the exterior of the tank 16 is an upwardly projecting lug or bracket 60 which is adapted to receive and support the handle 50 when the valve is in its opened position. Obviously, to close the valve it is merely necessary to lift the handle 50 from the bracket 60, rotate the handle sufficiently to permit the same to pass downwardly beside the bracket, and thereby permitting the valve stem 52 to close the valve.

Figure 1:
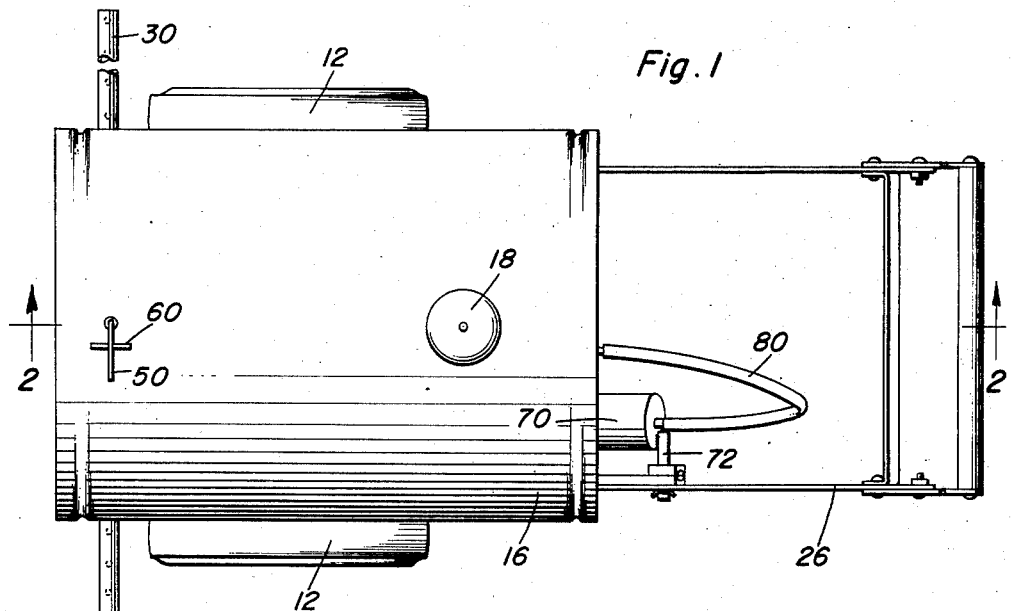
Figure 1 is a top plan view, parts being broken away, showing a suitable embodiment of apparatus incorporating therein the fertilizer dispensing device of this invention.

If desired, the influence of gravity may be relied upon as a means for feeding the liquid fertilizer from the interior of the tank to the spray head when the valve is open. In generalities it is preferred to provide means for forcing a flow of liquid for this purpose. To that end, there is provided a reciprocating pump consisting of a cylindrical pump barrel 70 which is pivotally secured as at 72, see in particular Figures 1 and 4, to a plate 20, at one end of the pump barrel. Reciprocable within the pump barrel is a piston 74 having a piston rod 76 attached thereto and connected as by a connecting bearing 78 to the crank throw 14 of the shaft 10. As will be indicated by the full and dotted lines in Figure 2, upon rotation of the crank 14, the piston will be reciprocated within the pump barrel, and the latter will oscillate about its pivotal mounting.

The discharge end of the pump is provided with a conduit 80 whereby air, compressed by the pump, will be delivered to the upper end of the tank 16, which is maintained sealed from the atmosphere, to thus maintain a pressure upon the liquid fertilizer within the tank to forcibly feed the same to the spray head when the control valve is open.

From the foregoing, it will now be apparent that as the apparatus is moved forwardly, the rotation of its supporting wheels will also serve to drive the pump and thus maintain a suitable pressure within the tank 16 for feeding liquid fertilizer therefrom at all times.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A liquid fertilizer dispenser for lawns and the like comprising an axle having supporting wheels fixedly secured thereto, a tank for liquid fertilizer mounted upon said axle and sealed from the atmosphere, a liquid fertilizer spray head supported beneath said tank and disposed transversely thereof and projecting laterally beyond the sides of the tank and forwardly of said wheels, means opening from the bottom of the tank for delivering liquid fertilizer from the tank to said spray head, a valve in said tank regulating flow through said means, means for operating said valve, an air pump, means connecting said pump to the top of said tank for applying pressure thereto whereby to cause flow of liquid fertilizer through said delivery means, means for driving said pump from said axle.

2. The combination of claim 1 wherein said pump includes a cylinder barrel and a piston and piston rod operatively associated therewith and disposed below said tank, a crank on said axle, said piston rod being connected to said crank, said cylinder barrel being supported from said tank for pivotal movement whereby to accommodate the angularity of movement of the piston rod.

3. The combination of claim 1 wherein said valve includes a valve seat in said conduit, a reciprocable valve, means mounting said valve for reciprocation towards and from said seat, said operating means comprising a valve stem extending from the valve to the exterior of the tank, a spring encircling said valve stem and urging the valve towards its seat.

4. The combination of claim 1 wherein said delivery means comprises a T-coupling having a neck communicating with said tank and a pair of opposite arms, said spray head comprising apertured pipes carried by said arms.

5. The combination of claim 1 wherein said delivery means comprises a T-coupling having a neck communicating with said tank and a pair of opposite arms, said spray head comprising apertured pipes carried by said arms, said valve comprising a valve seat in said neck and a valve body cooperating with said seat.

References Cited in the file of this patent

UNITED STATES PATENTS

| | | |
|---|---|---|
| 855,496 | Barber | June 4, 1907 |
| 1,174,905 | Seeger | Mar. 7, 1916 |
| 1,678,061 | Fowler et al. | July 24, 1928 |
| 1,799,570 | Serapin | Apr. 7, 1931 |
| 2,615,693 | Matirko | Oct. 28, 1952 |

FOREIGN PATENTS

| | | |
|---|---|---|
| 12,966 | Great Britian | of 1894 |
| 287,992 | Great Britain | Apr. 5, 1928 |